United States Patent
Lin et al.

(10) Patent No.: US 9,897,181 B1
(45) Date of Patent: Feb. 20, 2018

(54) EXTERNAL CIRCULATION BALL SCREW

(71) Applicant: HIWIN TECHNOLOGIES CORP, Taichung (TW)

(72) Inventors: Ming-Yao Lin, Taichung (TW); Ivan Yang, Taichung (TW)

(73) Assignee: HIWIN TECHNOLOGIES CORP, Taichung (TW)

( * ) Notice: Subject to any disclaimer, the term of this patent is extended or adjusted under 35 U.S.C. 154(b) by 0 days.

(21) Appl. No.: 15/460,225

(22) Filed: Mar. 15, 2017

(51) Int. Cl.
    *F16H 25/22* (2006.01)
(52) U.S. Cl.
    CPC ................. *F16H 25/2223* (2013.01)
(58) Field of Classification Search
    CPC .................................................. F16H 25/2214
    See application file for complete search history.

(56) References Cited

U.S. PATENT DOCUMENTS

| | | | | |
|---|---|---|---|---|
| 1,704,031 A * | 3/1929 | Boehm | ............... | F16H 25/2214 254/98 |
| 4,953,419 A * | 9/1990 | Schlenker | ........... | F16H 25/2214 74/424.86 |
| 5,063,809 A * | 11/1991 | Schlenker | ........... | F16H 25/2214 74/424.86 |
| 2003/0172759 A1 * | 9/2003 | Hayashi | ............... | F16H 25/2214 74/424.86 |
| 2011/0303036 A1 * | 12/2011 | Chen | ................... | F16H 25/2214 74/424.83 |
| 2012/0192668 A1 * | 8/2012 | Hsu | ..................... | F16H 25/2214 74/424.89 |
| 2013/0239725 A1 * | 9/2013 | Miyazaki | ............ | F16H 25/2214 74/424.86 |

* cited by examiner

*Primary Examiner* — Terence Boes
(74) *Attorney, Agent, or Firm* — Leong C. Lei

(57) ABSTRACT

An external circulation ball screw includes an elongate shaft having has an outer circumferential surface formed with a helical rolling groove; a nut having a through hole formed therein for receiving extension of the elongate shaft therethrough, the through hole having an inner circumferential surface formed with a rolling channel corresponding to the rolling groove, the rolling groove and the rolling channel collectively defining a loading passage, the nut having an outer surface, which includes, formed therein, two through apertures that are spaced from each other and in communication with the through hole and a cavity in communication with the two through apertures; rolling elements arranged in the loading passage and having a diameter between 0.3-1 mm; and a circulator having a U-shape and is arranged in the cavity and the through apertures and formed with a return passage connected to the loading passage to collectively define a circulation channel.

1 Claim, 6 Drawing Sheets

EXTERNAL CIRCULATION BALL SCREW

(a) TECHNICAL FIELD OF THE INVENTION

The present invention relates generally to a linear transmission element, and more particularly to an external circulation ball screw.

(b) DESCRIPTION OF THE PRIOR ART

U.S. Pat. No. 7,040,189 discloses a circulation device, which uses plastic molding to replace a metal guide tube and has a structure comprising two similar members respectively on left side and right side. The patent has the following problems. (1) The circulation device is structurally made up of two members that are a left member and a right member combined together so that the plastic molded members may be expanded outward to the left side and the right due to various factors including impact caused by rolling balls passing through a bend so that there is a concern of the structural strength. (2) The circulation device has a tangential external circulation structure and thus, an inlet opening and an outlet opening of the circulation device are arranged to be opposite to each other by being spaced by 180 degrees (as shown in FIG. 2A of the patent, so that a nut used must have a relatively large outside diameter and mounting holes of the nut (for mounting two legs of the circulation device) requires a relatively large depth. Due to a machining depth being relatively large, the stiffness of a machining tool or a machine chassis may not be sufficient, making to errors of the machining of the mounting holes so that the number of the rolling elements that may be located in a loading site (between the screw and the nut) is reduced. Such a structural design is particularly not suitable for a ball screw of a small specification (which stands for the diameter of the rolling elements being not greater than 1 mm). Thus, further improvement is necessary.

SUMMARY OF THE INVENTION

In view of the above problems, the primary objective of the present invention is to provide a circulation structure applicable to a ball screw of a small specification, particularly an external circulation ball screw.

To achieve the above objective, the present invention provides an external circulation ball screw, which comprises: an elongate shaft, which has an outer circumferential surface formed with a helical rolling groove; a nut, which comprises a through hole formed therein for receiving extension of the elongate shaft therethrough, the through hole having an inner circumferential surface formed with a rolling channel corresponding to the rolling groove, the rolling groove and the rolling channel collectively defining a loading passage, the nut having an outer surface, which comprises, formed therein, two through apertures that are spaced from each other and in communication with the through hole and a cavity in communication with the two through apertures; a plurality of rolling elements, which are arranged in the loading passage, the rolling elements having a diameter between 0.3-1 mm; and a circulator, which has a U-shape and is arranged in the cavity and the through apertures, the circulator being formed with a return passage connected to the loading passage, the return passage and the loading passage collectively defining a circulation channel; wherein a center of the elongate shaft and an end point of the return passage collectively define an imaginary line connecting therebetween, and the line and an axis passing through the center collectively define an included angle therebetween, which is referred to as an advancing angle, where the advancing angle is between 70 degrees to 80 degrees.

Preferably, the advancing angle has an angle of 75 degrees.

As such, with the advancing angle being so defined, the present invention allows a ball screw of a small specification to reduce an outside diameter of a nut while maintaining the stiffness thereof. The smaller the advancing angle is, the larger the outside diameter of the nut will be so that the present invention can improve the problem that a conventional ball screw of a small specification suffers, while maintaining the same performance, and allowing the entire size of the nut, when compared with one without such an improvement, to be reduced by 30%.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
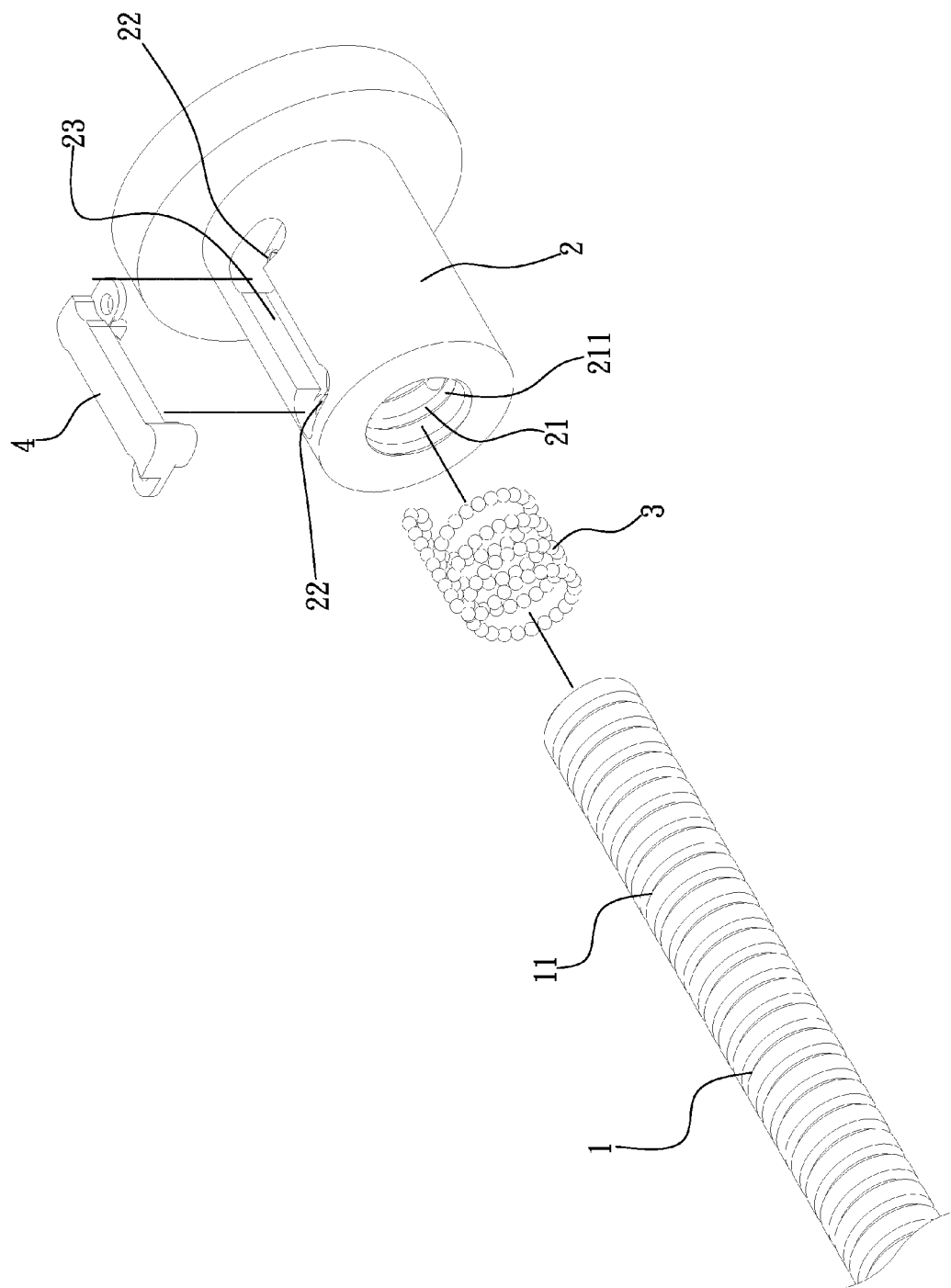
FIG. 1 is an exploded view showing an external circulation ball screw according to the present invention.
Figure 2:
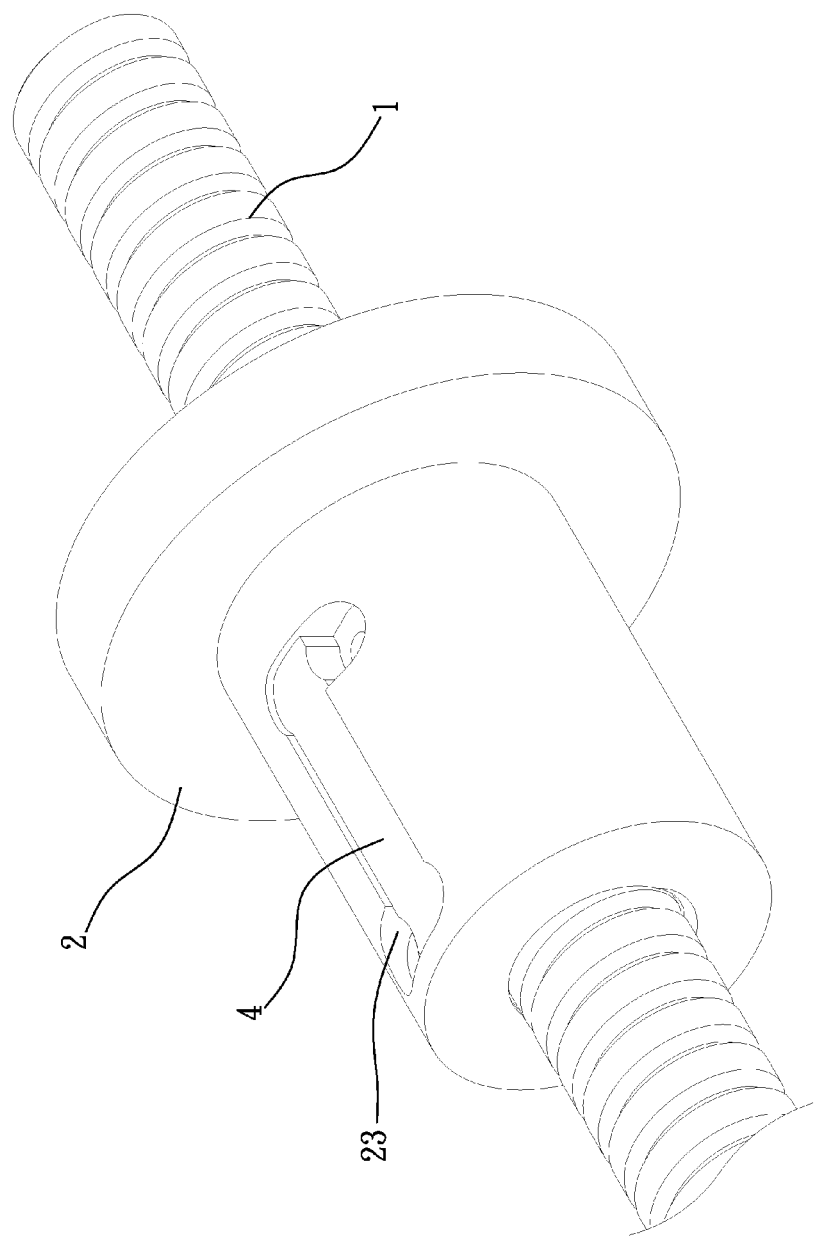
FIG. 2 is a perspective view showing the external circulation ball screw according to the present invention in an assembled form.
Figure 3:
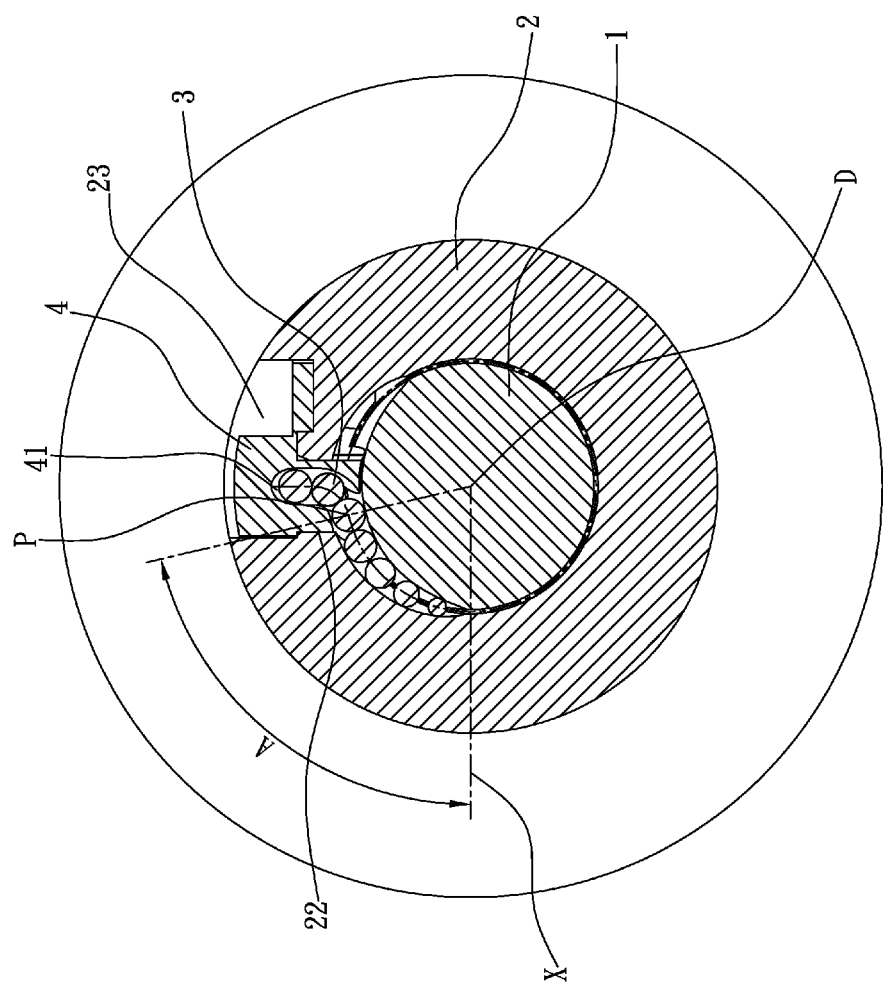
FIG. 3 is a cross-sectional view of the external circulation ball screw according to the present invention.
Figure 4:
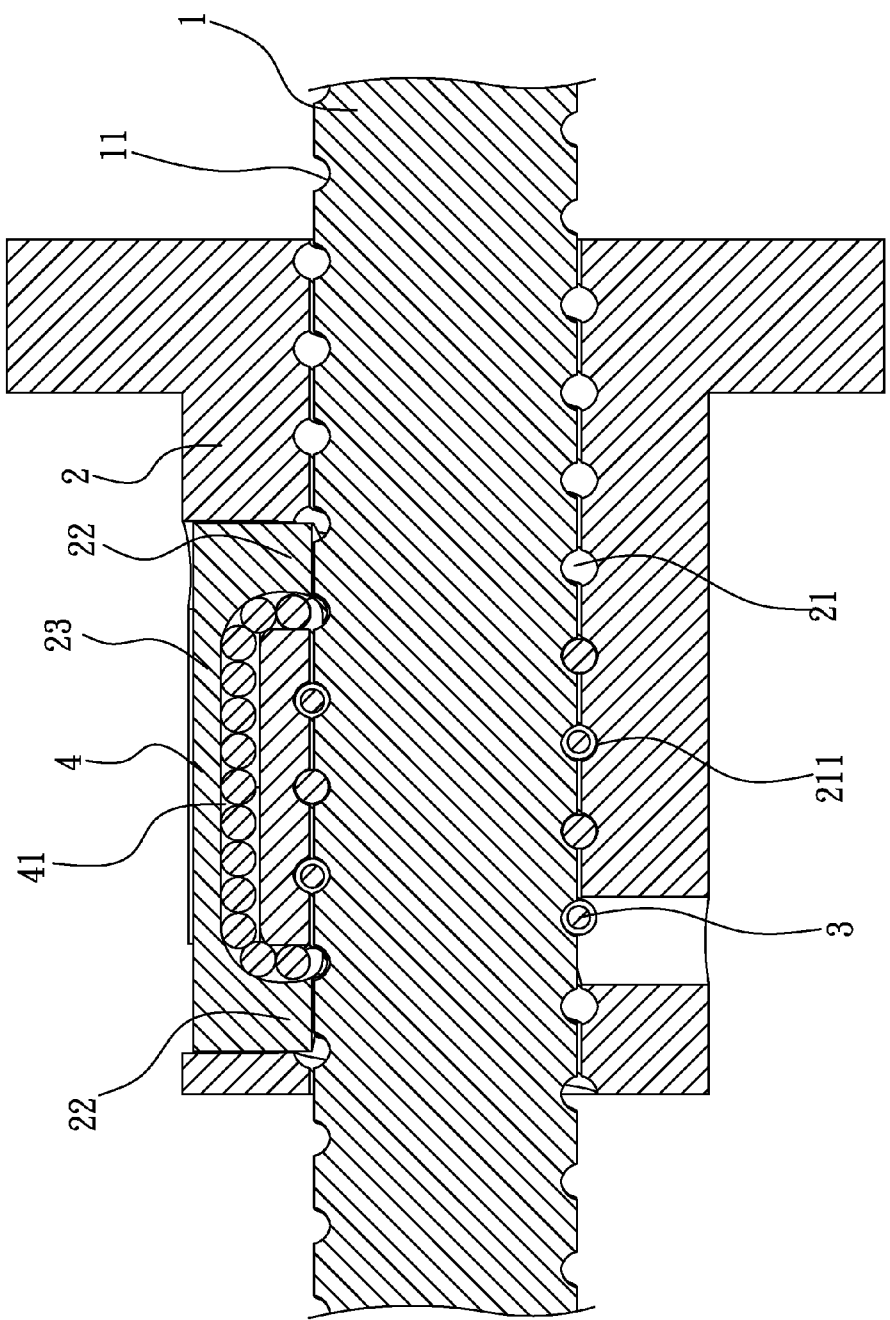
FIG. 4 is another cross-sectional view of the external circulation ball screw according to the present invention.
Figure 5:
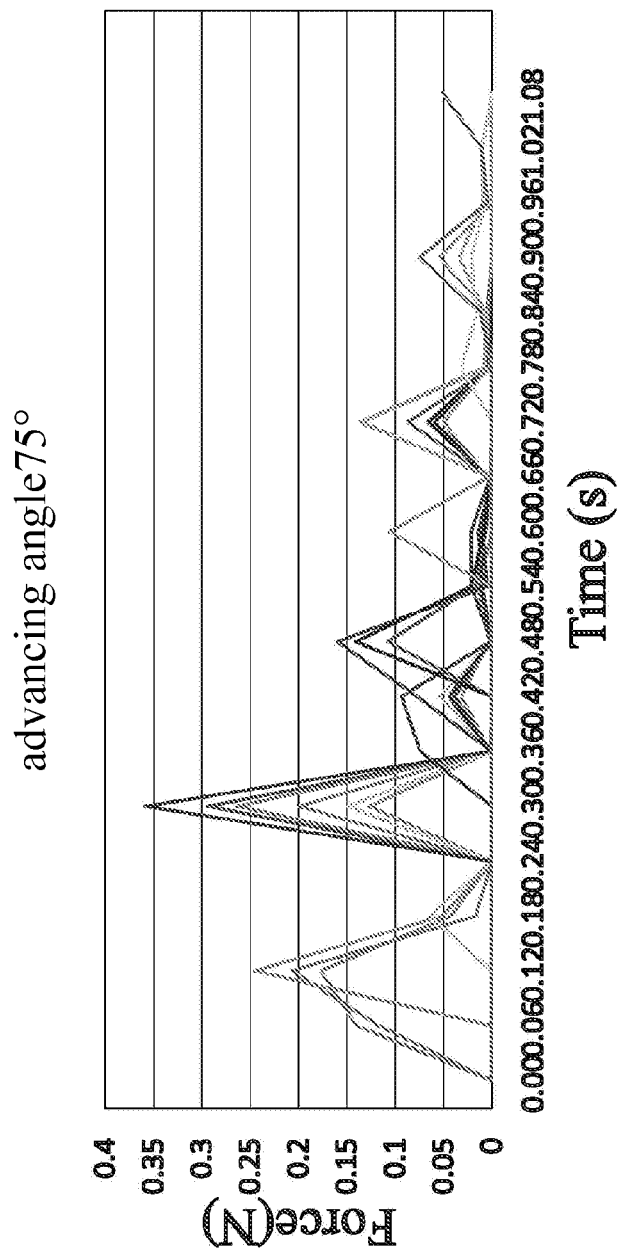
FIG. 5 is a plot simulating an impact force resulting from rolling elements at different locations along a circulation channel for an example where the external circulation ball screw according to the present invention is set with an advancing angle of 75 degrees.
Figure 6:
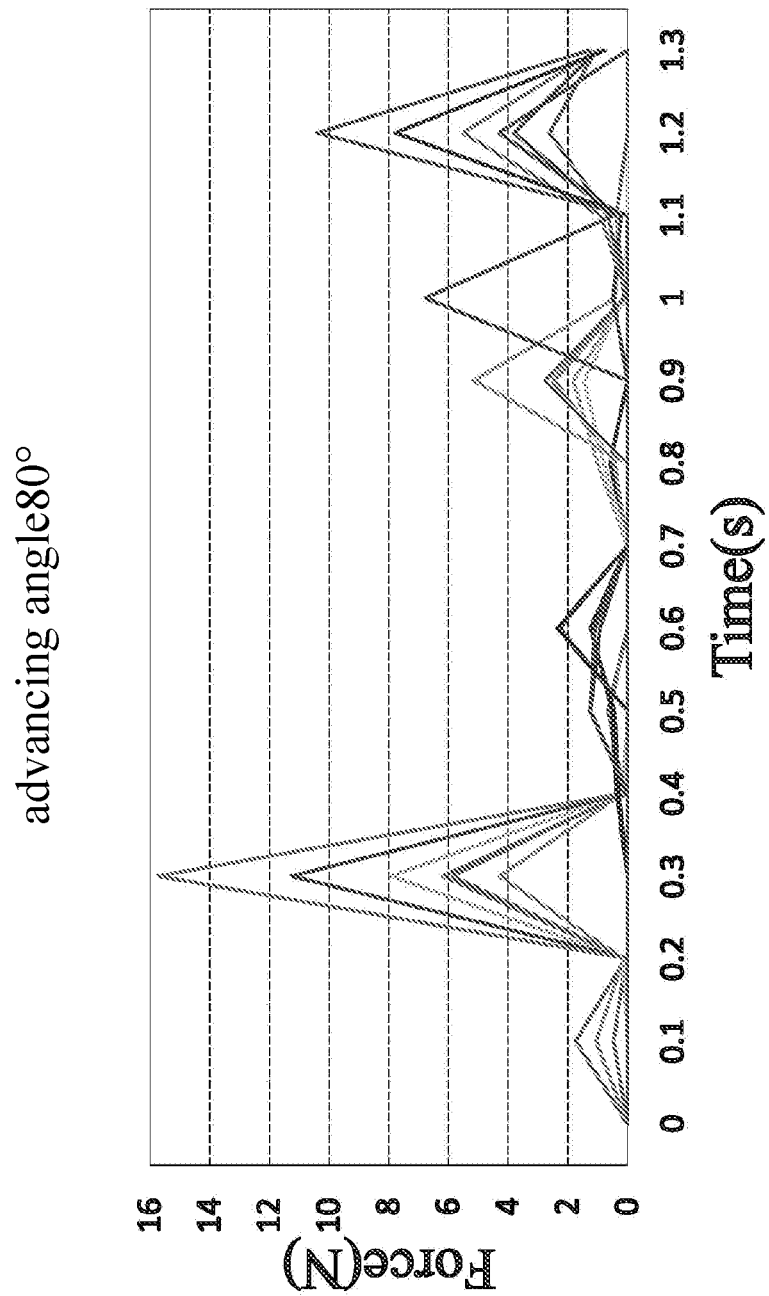
FIG. 6 is a plot simulating an impact force resulting from the rolling elements at different locations along the circulation channel for an example where the external circulation ball screw according to the present invention is set with an advancing angle of 80 degrees.

Referring to FIGS. 1-4, the present invention provides an external circulation ball screw, which comprises: an elongate shaft (1), which has an outer circumferential surface formed with a helical rolling groove (11); a nut (2), which comprises a through hole (21) formed therein for receiving extension of the elongate shaft (1) therethrough, the through hole (21) having an inner circumferential surface formed with a rolling channel (211) corresponding to the rolling groove (11), the rolling groove (11) and the rolling channel (211) collectively defining a loading passage, the nut (2) having an outer surface, which comprises, formed therein, two through apertures (22) that are spaced from each other and in communication with the through hole (21) and a cavity (23) in communication with the two through apertures (22); a plurality of rolling elements (3), which are arranged in the loading passage, the rolling elements (3) having a diameter between 0.3-1 mm; and a circulator (4), which has a U-shape and is arranged in the cavity (23) and the through apertures (22) with two limbs of the U-shape inserted into the through apertures (22) respectively, the circulator (4) being formed with a return passage (41) connected to the loading passage, the return passage (41) and the loading passage collectively defining a circulation channel; wherein a center (D) of the elongate shaft (1) and an end point (P) of the return passage collectively define an imaginary line connecting therebetween, and the line and an axis (X) passing through the center (D) collectively define an included angle therebetween, which is referred to as an advancing angle (A), where the advancing angle (A) is between 70 degrees to 80 degrees and an optimum angle of the advancing angle (A) is 75 degrees. The reason for 75 degrees being the optimum angle is that the outside diameter of the nut and stiffness of the nut are both optimum and an impact force resulting from the rolling elements (3) entering the circulator (4) is far smaller than that resulting from the advancing angle (A) being 80 degrees as shown in FIGS. 5 and 6.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

We claim:

1. An external circulation ball screw, comprising: an elongate shaft, which has an outer circumferential surface formed with a helical rolling groove; a nut, which comprises a through hole formed therein for receiving extension of the elongate shaft therethrough, the through hole having an inner circumferential surface formed with a rolling channel corresponding to the rolling groove, the rolling groove and the rolling channel collectively defining a loading passage, the nut having an outer surface, which comprises, formed therein, two through apertures that are spaced from each other and in communication with the through hole and a cavity in communication with the two through apertures; a plurality of rolling elements, which are arranged in the loading passage, the rolling elements having a diameter between 0.3-1 mm; and a circulator, which has a U-shape and is arranged in the cavity and the through apertures, the circulator being formed with a return passage connected to the loading passage, the return passage and the loading passage collectively defining a circulation channel along which the plurality of rolling elements cyclically move between the circulator and the elongate shaft; wherein a center of the elongate shaft and an end point of the return passage collectively define an imaginary line connecting therebetween, and the line and an axis passing through the center collectively define an included angle therebetween, which is referred to as an advancing angle, where the advancing angle is 75 degrees.

\* \* \* \* \*